United States Patent Office 3,452,033
Patented June 24, 1969

3,452,033
PREPARATION OF 5,6,7,8 - TETRAHYDROBENZO-FURO [2,3-b] PYRIDINES AND 1,2,3,4-TETRA-HYDRODIBENZOFURANS
Aram Mooradian, Schodack, N.Y., assignor to Sterling Drug Inc., New York, N.Y., a corporation of Delaware
No Drawing. Continuation-in-part of application Ser. No. 596,395, Nov. 23, 1966. This application May 9, 1967, Ser. No. 637,056
Int. Cl. C07d 5/40, 31/28; A61k 25/00
U.S. Cl. 260—297    3 Claims

ABSTRACT OF THE DISCLOSURE

Benzofurans are prepared by heating above approximately 50° C. an O-phenyl ketoxime in an acidic medium where the O-phenyl group is unsubstituted at one position ortho to the position containing the O-linkage and is substituted at either one or both of the para- and other ortho-positions by an electron withdrawing group. The benzofurans have pharmacological properties, e.g., anti-inflammatory activity, and chemotherapeutic properties, e.g., anti-bacterial activity.

---

This invention relates to a novel process for preparing benzofurans and to compositions used and prepared therein.

This application is a continuation-in-part of my copending application Ser. No. 596,395, filed Nov. 23, 1966.

The invention sought to be patented, in its process aspect, resides in the process for producing a benzofuran which comprises heating above approximately 50° C. an O-phenyl ketoxime in an acidic medium where the O-phenyl group is unsubstituted at one position ortho to the position containing the O-linkage and is substituted at either one or both of the para- and other orthopositions by an electron withdrawing group, e.g., nitro, trihalomethyl, carbo - (lower - alkoxy), carboxy, cyano, lower-alkanoyl, phenylsulfonyl and N,N-di-(lower-alkyl) sulfamyl. Preferred ketoximes because of their ready availability are O-phenyl ketoximes of low-molecular weight ketones, e.g., a di-(lower-alkyl) ketone, a cyclohexanone, a lower-alkyl phenyl ketone or a lower-alkyl lower-ketoalkanoate. A variation of the process aspect of the invention resides in the process which comprises heating in an acidic medium an O-(2-pyridyl)cyclohexanone oxime to form a 5,6,7,8-tetrahydrobenzofuro [2,3-b]pyridine. The benzofurans produced by the process of the invention possess the inherent applied use characteristics of having pharmacological properties, e.g., anti-inflammatory activity, as determined by standard pharmacological evaluation procedures and of having chemotherapeutic properties, e.g., anti-bacterial activity, as determined by standard chemotherapeutic evaluation procedures. Also, they are useful as intermediates for the preparation of other benzofurans having pharmacological or chemotherapeutic properties.

The invention sought to be patented, in one composition aspect, resides in 4-benzoyloxycyclohexanone oxime which was found, in addition to being useful as an intermediate in the preparation of O-phenyl oximes, to possess the inherent applied use characteristics of having pharmacological properties, e.g., anti-inflammatory activity.

Another composition aspect of the invention sought to be patened resides in the intermediates: O-(6-chloro-2-pyridyl)cyclohexanone oxime, 4 - [(4 - nitro-phenoxy)imino]cyclohexyl benzoate, O-(4-N,N-dimethylsulfamylphenyl)acetophenone oxime, O-(4-phenylsulfonylphenyl)acetone oxime, O-(4-N,N-dimethylsulfamylphenyl)-4-methoxyacetophenone oxime (also has antibacterial activity), O-(4-cyanophenyl)acetone oxime, and O-(4-acetylphenyl)acetone oxime, the last two compounds also having anti-inflammatory activity.

The invention sought to be patented, in another composition aspect, resides in the following benzofurans: ethyl 2 - methyl-5-nitro-7-benzofurancarboxylate, 2-methyl-7-nitro-5-trifluoromethylbenzofuran, 2 - methyl-5-nitro-7-trifluoromethylbenzofuran, 2-methyl-5-trifluoromethylbenzofuran, 5-acetamido-2-methylbenzofuran, 5-cyano-2-methylbenzofuran, 2-phenyl - 5 - trifluoromethylbenzofuran, 2-phenyl - 7-trifluoromethylbenzofuran, N,N-dimethyl-2-phenyl-5-benzofuransulfonamide, N,N-dimethyl-2-(4-methoxyphenyl)-5-benzofuransulfonamide, ethyl 2-methyl-5-nitrobenzofuran - 3-acetate, 2 - benzoyloxy-1,2,3,4-tetrahydro-8-nitrodibenzofuran, 2 - chloro-5,6,7,8-tetrahydrobenzofuro[2,3-b]pyridine, 2-methyl - 5-phenyl-sulfonylbenzofuran, ethyl 2-phenyl - 5-benzofurancarboxylate, ethyl 2-(4-methoxyphenyl) - 5-benzofurancarboxylate, and 2 - diethylaminoethyl 2 - (4 - methoxyphenyl)-5-benzofurancarboxylate. These novel compounds, which are produced by the process of the invention, possess the inherent applied use characteristics of having pharmacological properties, e.g., anti-inflammatory activity, as determined by standard pharmacological evaluation procedures and, also, of having chemotherapeutic properties, e.g., antibacterial activity, as determined by standard chemotherapeutic evaluation procedures.

The term "lower-alkyl," as used throughout this specification, means an alkyl radical having from one to six carbon atoms inclusive, illustrated by methyl, ethyl, isopropyl, n-propyl, n-butyl, sec-butyl, isobutyl, n-amyl, n-hexyl, and the like.

The term "lower-alkoxy," as used throughout this specification, means an alkoxy radical having from one to six carbon atoms inclusive, illustrated by methoxy, ethoxy, n-propoxy, isopropoxy, n-butoxy, sec-butoxy, isobutoxy, n-hexoxy, and the like.

The term "lower-ketoalkanoate," as used throughout this specification, means a keto-alkanoate ester moiety derived from a keto-alkanoic acid having from three to six carbon atoms, said lower-ketoalkanoate illustrated by pyruvate, acetoacetate and levulinate.

The manner and process of making and using the instant invention will now be generally described so as to enable a person skilled in the art of chemistry to make and use the same, as follows:

Preparation of intermediate O-phenyl ketoximes

These intermediates, some of which are known and some of which are novel, are prepared by reacting a metal salt of the ketoxime in a suitable solvent, e.g., dimethyl sulfoxide, tetrahydrofuran, acetonitrile, dimethylformamide or dimethylacetamide, with an ortho-substitutable active phenyl halide, i.e., a phenyl halide where phenyl is unsubstituted at one ortho position and is substituted at either one or both of the para and the other ortho positions by a low molecular electron withdrawing group, as illustrated above. The reaction is usually exothermic and is carried out by mixing the reactants in the solvent with stirring and then stirring the reaction mixture until the reaction is complete. Gentle heating, up to about 50 to 75° C., might be necessary to start the reaction in some instances wherein gentle heating is then continued to ensure completion of the reaction. Alkali metal salts of the oximes are preferred because of their ready availability and ease of preparation by generally known procedures, e.g., by reacting sodium hydride or potassium alkoxide with the oxime. The corresponding O-(2-pyridyl)cyclohexanone oximes are prepared by the above procedure using a 2-halopyridine and a metal salt of cyclohexanone oxime.

Conversion of O-phenyl oximes to benzofurans

This novel rearrangement conversion is carried out by heating above approximately 50° C. the O-phenyl oxime in an acidic medium, preferably a strong inorganic acid, e.g., hydrogen chloride, hydrogen bromide, in a suitable solvent, e.g., a lower-alkanol, a lower-alkanecarboxylic acid of two to four carbon atoms, and the like; a preferred solvent is ethanol. A preferred lower-alkanecarboxylic acid solvent is acetic acid. The rearrangement conversion can also be run in a lower-halogenated-alkanoic acid, e.g., trifluoroacetic acid, which acts both as acid and solvent. The reaction is conveniently effected by refluxing the O-phenyl oxime in ethanolic hydrogen chloride from about one to four hours. The reaction also was found to take place at lower temperatures, down to about 50° C., but requiring a longer reaction period; higher temperatures, up to about 100–125° C. or higher, can be used but to no particular advantage. In any event, it will be obvious that the reaction temperature should be below that which would result in any significant decomposition of the reactants or final products. Below 50° C., benzofuran formation ordinarily does not take place in sufficient degree to afford practical yields.

Modifications of the foregoing process will be apparent to a chemist skilled in the art. For example, in place of hydrogen chloride, hydrogen bromide or trifluoroacetic acid, there can be used other strong inorganic acids, e.g., hydrogen iodide, hydrogen fluoride, sulfuric acid, boron trifluoride etherate, and the like, or strong organic acids, e.g., methanesulfonic acid, benzenesulfonic acid, p-toluenesulfonic acid, and the like. Also, other solvents can be used, e.g., tetrahydrofuran, dioxane, and the like.

For purpose of illustration but without limiting the generality of the foregoing, the conversion is illustrated for preferred embodiments as follows:

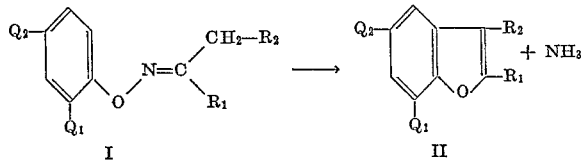

where at least one of $Q_1$ and $Q_2$ is a low-molecular weight electron withdrawing group, e.g., nitro, trihalomethyl, carbo-(lower-alkoxy), carboxy, cyano, lower-alkanoyl, phenylsulfonyl, and N,N-di-(lower-alkyl)sulfamyl, and the other one of $Q_1$ and $Q_2$ is hydrogen, said electron withdrawing group or another low-molecular group as illustrated below; $R_1$ is lower-alkyl or phenyl; $R_2$ is hydrogen, alkyl having from one to five carbon atoms or $CH_2COO$-(lower-alkyl); or, $R_1$ and $R_2$ are attached to form together with the 2- and 3-carbon atoms of the benzofuran ring a tetrahydrobenzo ring. Variations of the above preferred structures of Formulas I and II encompassed in the process of the invention will be apparent to the skilled chemist, e.g., the presence of one or more other low-molecular substituents, e.g., lower-alkyl, halo, lower-alkoxy, lower-alkylmercapto, lower-alkylsulfonyl, di-(lower-alkyl)amino, and the like, in available ring-positions of the phenyl ($R_1$) or benzenoid ring; the use of O-(2-pyridyl) groups in place of O-phenyl, said 2-pyridyl being unsubstituted or bearing at ring-positions 4, 5 and 6 one or more said low-molecular weight substituents; and, the use of other low-molecular groups for $R_1$ and $R_2$. Illustrative conversions of the foregoing are: 2-methyl-5-nitrobenzofuran from O-(4-nitrophenyl)acetone oxime; 5-nitro-2-phenylbenzofuran from O-(4-nitrophenyl)acetophenone oxime; ethyl 2-methyl-5-nitro-7-benzofurancarboxylate from O-(2-carboxy-4-nitrophenyl)acetone oxime; 2-methyl-7-nitro-5-trifluoromethylbenzofuran from O-(2-nitro-4-trifluoromethylphenyl)acetone oxime; 5-cyano-2-methylbenzofuran from O-(4-cyanophenyl)acetone oxime; N,N-dimethyl-2-phenyl-5-benzofuransulfonamide from O-(4-N,N-dimethylsulfamylphenyl)acetophenone oxime; 1,2,3,4-tetrahydro-8-nitrodibenzofuran from O-(4-nitrophenyl)cyclohexanone oxime; 2-benzoyloxy-1,2,3,4-tetrahydro-8-nitrodibenzofuran from 4-[(4-nitrophenoxy)imido]cyclohexyl benzoate; 2-chloro-5,6,7,8-tetrahydrobenzofuro[2,3-b]pyridine from O-(5-chloro-2-pyridyl)cyclohexanone oxime; a mixture of 2,3-dimethyl-5-nitrobenzofuran and 2-ethyl-5-nitrobenzofuran from O-(4-nitrophenyl)-2-butanone oxime; and, ethyl 2-methyl-5-nitrobenzofuran-3-acetate from tert-butyl O-(4-nitrophenyl)levulinate oxime.

The molecular structures of the O-phenyl oximes and benzofurans were assigned on the basis of study of their infrared and NMR spectra, and confirmed by the correspondence of calculated and found values for the elementary analyses for representative examples.

The best mode contemplated for carrying out the invention will now be set forth as follows:

(A) Preparation of O-phenyl oximes (1) O-(4-nitrophenyl)acetone oxime.—To a solution of 3.65 g. of acetone oxime in 125 ml. of dimethyl sulfoxide was added 2.15 g. of a 56% dispersion of sodium hydride in mineral oil. The resulting mixture was stirred for fifteen minutes and then there was added 10.1 g. of 4-bromonitrobenzene. After the subsequent exothermic reaction and bubbling had subsided, the reaction mixture was poured into water and the resulting brown precipitate was collected. The solid was suspended in alcohol and water added to the suspension. The solid that separated was collected, dried and recrystallized from isopropyl alcohol to yield 4.9 g. of O-(4-nitrophenyl) acetone oxime, M.P. 104–106° C.

(2) O-(2,4-dinitrophenyl)acetone oxime, M.P. 87–91° C., was prepared following the procedure of Example A1 by reacting the sodium salt of acetone oxime and 2,4-dinitrochlorobenzene in tetrahydrofuran for two hours.

(3) O-(4-nitrophenyl)acetophenone oxime), M.P. 122–124° C., was prepared as in Example A1 by refluxing the sodium salt of acetophenone oxime and 4-nitrofluorobenzene in tetrahydrofuran for ten hours.

(4) O-(2-nitrophenyl)acetone oxime, M.P. 56–59° C., was prepared as in Example A1 by stirring the sodium salt of acetone oxime and 2-nitro-bromobenzene in dimethyl sulfoxide for forty-five minutes.

(5) O-(2-carboxy-4-nitrophenyl)acetone oxime.—To a solution of 20.1 g. of 2-chloro-5-nitrobenzoic acid in 250 ml. of tetrahydrofuran was added with stirring 4.27 g. of a 56.2% dispersion of sodium hydride in mineral oil. Sufficient dimethyl sulfoxide was added to the suspension to effect dissolution. A solution of 7.3 g. of acetone oxime in 100 ml. of tetrahydrofuran was heated with 4.27 g. of 56.2% sodium hydride followed by addition of 50 ml. of dimethyl sulfoxide. The mixture was heated with stirring until evolution of hydrogen had ceased (about fifteen minutes) and then poured into the solution of the benzoic acid salt. The resulting suspension was first stirred at room temperature for about forty-five minutes and then heated at reflux for about ninety minutes. The reaction mixture was next treated with water and the tetrahydrofuran was removed by disilling in vacuo. The remaining aqueous layer was extracted with n-pentane to remove the mineral oil, treated with decolorizing charcoal and filtered, and the filtrate acidified with 10% aqueous hydrochloric acid. The solid that separated was collected and recrystallized from ethyl acetate to yield 16.0 g. of O-(2-carboxy-4-nitrophenyl)acetone oxime, M.P. 169–171° C. (with decomposition).

(6) O-(2-nitro-4-trifluoromethylphenyl)-acetone oxime, M.P. 52–55° C., was prepared as in Example A1 by stirring at room temperature for one hour the sodium salt of acetone oxime and 4-chloro-3-nitrobenzotrifluoride in dimethyl sulfoxide. After pouring the reaction mixture into ice and water, the product was obtained by extracting with ether, evaporating off the ether, and recrystallizing from ethanol and then from n-hexane.

(7) O-(4-trifluoromethylphenyl)acetone oxime.—To 200 ml. of dry dimethylformamide was added 7.3 g. of acetone oxime and 11.2 g. of postassium tertiary-butoxide. The resulting mixture was stirred for a few minutes and then there was added 16.4 g. of 4-fluorobenzotrifluoride and the reaction mixture was heated with stirring for three hours on a steam baht. It was then poured into three hours on a steam bath. It was then poured into product was collected and recrystallized from n-pentane, using decolorizing charcoal, to yield 12.6 g. of O-(4-trifluoromethylphenyl)acetone oxime, M.P. 46–49° C.

(8) O-(4-cyanophenyl)acetone oxime, M.P. 100–103° C., was prepared as in Example A6 by stirring at about 50–60° C. for one hour a mixture of the potassium salt of acetone oxime (using potassium tertiary-butoxide) and 4-fluorobenzonitrile in dimethyl sulfoxide. When tested for anti-inflammatory activity by the standard evaluation procedure of inhibiting carrageenin-induced local foot edema in fasted rats, O-(4-cyanophenyl)acetone oxime was found to cause 28% inhibition at 100 mg./kg. orally.

(9) O-(4-nitrophenyl)cyclopheanone oxime.—To a solution of 17 g. of cyclohexanone oxime in 100 ml. of dimethyl sulfoxide and 300 ml. of tetrahydrofuran was added 6.45 g. of a 56% solution of sodium hydride in mineral oil. This mixture was stirred until most of the bubbling subsided and then there was added 23.7 g. of 4-chloronitrobenzene. After the reaction mixture had been stirred for an additional six hours at room temperature, the tetrahydrofuran was then removed by distilling in vacuo and water was added to the residue. The crystalline product was collected and recrystallized twice from isopropyl alcohol to yield 12.5 g. of O-(4-nitrophenyl)cyclohexanone oxime, M.P. 99–101° C.

(10) O-(6-chloro-2-pyridyl)cyclohexanone oxime. — To 15.8 g. of cyclohexanone oxime in 100 ml. of dimethyl sulfoxide was added 15.7 g. of postassium tertiary-butoxide and 22 g. of 2,6-dichloropyridine. The resulting mixture was stirred for one hour, then poured into water with stirring, and the mixture was stirred until the oil that separated solidified. The solid was collected and dissolved in hot n-hexane. The hot hexane solution was treated with decolorizing charcoal and filtered. Removal of the hexane by distilling in vacuo gave 16.0 g. of crude product. Recrystallization of 14.0 g. of this product from n-hexane and subsequent purification by passing an ether solution of the crystals through a column of aluminum oxide and elution of the colmn with ether gave 8.8 g. of white crystalline product which was further recrystallized twice from isopropyl alcohol to yield 4.6 g. of white crystalline product O-(6-chloro-2-pyridyl)cyclohexanone oxime, M.P. 79–81° C.

(11) 4-[(4-nitrophenoxy)imino]cyclohexyl benzoate, M.P. 123.5–125.0° C., was prepared as in Example A6 by reacting the potassium salt of 4-benzoyloxycyclohexanone oxime and 4-fluoronitrobenzene in dimethylacetamide for about fifteen minutes.

The above intermediate 4-benzoyloxycyclohexanone oxime was prepared as follows: A reaction mixture containing 43.6 g. of 4-benzoyloxycyclohexanone, 15.3 g. of hydroxylamine hydrochloride and 150 ml. of pyridine was heated on a steam bath for four hours and then poured into one liter of water. The oil that separated was extracted with ether. The ether extract was washed with water, dried over anhydrous magnesium sulfate and calcium sulfate, treated with decolorizing charcoal and filtered, and the ether removed by vacuum distillation.

The aqueous layer was removed by decantation and the remaining oil was washed several times with water whereupon the oil solidified. The solid was collected, washed with water, dried in a vacuum oven at 45° for two hours, and recrystallized twice from ether to yield 26 g. of crystalline 4-benzoyloxycyclohexanone oxime, M.P. 106–108° C. 4-benzoyloxycyclohexanone oxime was found to cause 32% inhibition of carrageenin-induced local foot edema in fasted rats at 100 mg./kg. orally.

(12) O-(4-nitrophenyl)-2-butanone oxime, M.P. 41–42° C., was prepared as in Example A6 by stirring a mixture of the sodium salt of 2-butanone oxime and 4-fluoronitrobenzene in tetrahydrofuran for two hours.

(13) O-(4-trifluoromethylphenyl)acetophenone oxime, M.P. 94–97° C., was prepared as in Example A1 by refluxing for three hours a mixture of the sodium salt of acetophenone oxime and 4-fluorobenzotrifluoride in a mixture of tetrahydrofuran and dimethyl sulfoxide.

(14) O-(2-chloro-4-nitrophenyl)acetone oxime, M.P. 117–119° C., was prepared as in Example A1 by heating on a steam bath for six hours a stirred mixture of the potassium salt (using potassium tert-butoxide) of acetone oxime and 3,4-dichloronitrobenzene in dimethylformamide.

(15) O - (4 - N,N - dimethylsulfamylphenyl)acetophenone oxime, M.P. 95–97° C., was obtained as in Example A6 by stirring with no external heating for two hours a mixture of the sodium salt of acetophenone oxime and N,N-dimethyl-4-fluorobenzenesulfonamide in a mixture of tetrahydrofuran and dimethyl sulfoxide. The oxime product was recrystallized from ether.

(16) O - (4 - carbethoxyphenyl)acetophenone oxime, M.P. 52–54° C., from n-heptane, was prepared as in Example A1 by heating on a steam bath with stirring for two hours the sodium salt of acetophenone oxime and ethyl 4-fluorobenzoate in a mixture of tetrahydrofuran and dimethyl sulfoxide.

(17) O-(4-acetylphenyl)acetone oxime, M.P. 50–53° C., from n-hexane, was prepared as in Example A7 by stirring at room temperature for three hours the potassium salt of acetone oxime and 4-fluoroacetophenone in dimethyl sulfoxide. O-(4-acetylphenyl)acetone oxime, when tested in rats for anti-inflammatory activity by the procedure referred to in Example A8, was found to cause 44% inhibition at 100 mg./kg. orally.

(18) O-(4-phenylsulfonylphenyl)acetone oxime, M.P. 130–134° C., from isopropyl alcohol, was prepared as in Example A1 by mixing with stirring the sodium salt of acetone oxime and 4-fluorophenyl phenyl sulfone in a mixture of tetrahydrofuran and dimethyl sulfoxide and allowing the reaction mixture to stand at room temperature for three days.

(19) O - (4 - N,N - dimethylsulfamylphenyl) - 4-methoxyacetophenone oxime, M.P. 135–137° C., from ethanol, was prepared as in Example A1 by heating on a steam bath for two hours a stirred mixture of the sodium salt of 4-methoxyacetophenone oxime and N,N-dimethyl-4-fluorobenzenesulfonamide in a mixture of tetrahydrofuran and dimethyl sulfoxide. O-(4-N,N-dimethylsulfamylphenyl)-4-methoxyacetophenone oxime was found to have in vitro bacteriostatic activity against *Pseudomonas aeruginosa* at a test concentration of 0.10 mg./cc.

(20) O - (2 - nitrophenyl) - 4 - methoxyacetophenone oxime, M.P. 111–113° C., from isopropyl alcohol, was prepared as in Example A1 by heating on a steam bath for two hours a stirred mixture of the sodium salt of 4-methoxyacetophenone oxime and 2-chloronitrobenzene in a mixture of tetrahydrofuran and dimethyl sulfoxide.

(21) O - (4 - carbethoxyphenyl) - 4 - methoxyacetophenone oxime, M.P. 90–92° C., from isopropyl alcohol, was prepared as in Example A1 by heating on a steam bath for three hours a stirred mixture of the sodium salt of 4-methoxyacetophenone oxime and ethyl 4-fluorobenzoate in a mixture of tetrahydrofuran and dimethyl sulfoxide.

(22) O - (2 - trifluoromethylphenyl)acetophenone oxime, an oil, was prepared as in Example A6 by heating on a steam bath a stirred mixture of the sodium salt of acetophenone oxime and 2-fluorobenzotrifluoride in a mixture of tetrahydrofuran and dimethyl sulfoxide.

(23) O - (4 - nitro - 2 - trifluoromethylphenyl)acetone oxime, M.P. 87–90° C., was prepared as in Example A1 by stirring at room temperature for two hours the sodium salt of acetone oxime and 4-chloro-3-trifluoromethylnitrobenzene in a mixture of tetrahydrofuran and dimethyl sulfoxide.

(B) Conversion of O-phenyl oximes to benzofurans (1) 2-methyl-5-nitrobenzofuran.—A 1.0 g. portion of O-(4-nitrophenyl)acetone oxime was heated under reflux with 10 ml. of 5 N ethanolic hydrogen chloride for ninety minutes. The reaction mixture was poured into water and the product that separated was collected, washed with water, dried and recrystallized from isopropyl alcohol to yield 0.7 g. of 2-methyl-5-nitrobenzofuran, M.P. 95–96° C. This reaction, using 1.0 g. of O-(4-nitrophenyl)acetone oxime and 15 ml. of 5 N ethanolic hydrogen chloride, was carried out by keeping the reaction mixture at about 56° C., using an external refluxing acetone bath, for about sixteen hours. There was thus obtained 0.86 g. of 2-methyl-5-nitrobenzofuran, M.P. 92–94° C. (unrecrystallized), mixed M.P.—no depression. The structures of this and subsequent benzofurans produced by the process of the invention were confirmed by their infrared and nuclear magnetic resonance spectral analyses.

2-methyl-5-nitrobenzofuran was also obtained from O-(4-nitrophenyl)acetone oxime by the following variations in the procedure using different acids and solvents: In one, a mixture of 2.0 g. of O-(4-nitrophenyl)acetone oxime and 10 ml. of 30% hydrogen bromide in acetic acid was heated on a steam bath for two hours and poured into water whereupon the precipitated product was collected and dried to yield 1.6 g. of 2-methyl-5-nitrobenzofuran, M.P. 95–98° C. (mixed M.P.—no depression). In the other, a mixture of 2.0 g. of O-(4-nitrophenyl)acetone oxime and 8 ml. of trifluoroacetic acid was heated on a steam bath for two hours and poured into water; the product that separated was collected and recrystallized from isopropyl alcohol-water, using decolorizing charcoal, to yield 1.0 g. of 2-methyl-5-nitrobenzofuran, M.P. 93–97° C. (mixed M.P.—no depression).

2-methyl-5-nitrobenzofuran was converted to 5-amino-2-methylbenzofuran and the latter to 5-acetamido-2-methylbenzofuran as follows: To 2 g. of 2-methyl-5-nitrobenzofuran in 50 ml. of hot ethanol was added 2 ml. of 100% hydrazine hydrate followed by slow addition of Raney nickel. The resulting suspension was heated thirty minutes on a steam bath, the catalyst was filtered off and the filtrate was concentrated in vacuo. The residual oil was taken up in ether and the ether solution treated with a solution of hydrogen chloride in ether. The resulting precipitate was collected to give 1.5 g. of 5-amino-2-methylbenzofuran hydrocloride, M.P. 224–226° C. with decomposition. A solution containing 4 g. of 5-amino-2-methylbenzofuran and 3.1 g. of acetic anhydride was heated one hour on a steam bath and poured into water. After the aqueous mixture had been allowed to stand overnight, the crystalline product was collected and recrystallized from isopropyl alcohol to yield 2.4 g. of 5-acetamido-2-methylbenzofuran, M.P. 135–137° C. 5-acetamido-2-methylbenzofuran was found to have in vitro bacteriostatic activity against *Escherichia coli* and *Proteus vulgaris* each at a test concentration of 0.20 mg./cc. This compound also was found to cause 45% inhibition of carrageenin-induced local foot edema in fasted rats at 100 mg./kg. orally.

(2) 5,7-dinitro-2-methylbenzofuran, 0.9 g., M.P. 163–165° C., from acetone-isopropyl alcohol, was prepared as in Example B1 using 4.8 g. of O-(2,4-dinitrophenyl) acetone oxime, 20 ml. of 4.8 N ethanolic hydrogen chloride and a reflux period of about eighteen hours.

(3) 5-nitro-2-phenylbenzofuran, 11.1 g., M.P. 158–161° C., was prepared as in Example B1 using 13.0 g. of O-(4-nitrophenyl)acetophenone oxime, 100 ml. of 4.81 N ethanolic hydrogen chloride and a reflux period of about two hours. 5-nitro-2-phenylbenzofuran was found to have in vitro bacteriostatic activity against *Staphylococcus aureus, Pseudomonas aeruginosa, Escherichia coli* and *Proteus vulgaris* at test concentrations of 0.10, 0.075, 0.075 and 0.075 mg./cc. respectively. 5-nitro-2-phenylbenzofuran also was found to cause 30% inhibition of carregeenin-induced local foot edema in fasted rats at 100 mg./kg. orally.

(4) 2-methyl-7-nitrobenzofuran, 5.5 g., M.P. 101–103° C., from n-heptane, was prepared following the procedure described above in Example B1 using 15.5 g. of O-(2-nitrophenyl)acetone oxime, 75 ml. of 7.5 N ethanolic hydrogen chloride and a reflux period of one hour. 2-methyl-7-nitrobenzofuran was found to cause 31% inhibition of carrageenin-induced local foot edema in fasted rats at 100 mg./kg. orally.

(5) Ethyl 2-methyl-5-nitro-7-benzofurancarboxylate, 3.9 g., M.P. 142–143° C., from ethyl acetate, was prepared as in Example B1 using 8.9 g. of O-(2-carboxy-4-nitrophenyl)acetone oxime, 100 ml. of 7.9 N ethanolic hydrogen chloride and a reflux period of two hours. The product was extracted from the reaction mixture with methylene dichloride and recrystallized from ethyl acetate. Ethyl 2-methyl-5-nitro-7-benzofurancarboxylate was found to have in vitro bacteriostatic activity against *Escherichia coli* at a test concentration of 0.15 mg./cc.

(6) 2-methyl-7-nitro-5-trifluoromethylbenzofuran, 1.6 g., M.P. 86–88° C., from isopropyl alcohol, was prepared as in Example B1 using 11.6 g. of O-(2-nitro-4-trifluoromethylphenyl)acetone oxime in 50 ml. of absolute ethanol, 100 ml. of 4.8 N ethanolic hydrogen chloride and a reflux period of about fifteen hours after the reaction mixture had been saturated with hydrogen chloride. The product was obtained from the reaction mixture by evaporating off the ethanol, extracting with ether, removing the ether, and recrystallizing from isopropyl alcohol.

(7) 2-methyl-5-trifluoromethylbenzofuran.—The intermediate O-(4-trifluoromethylphenyl)acetone oxime was prepared as in Example A1 using the sodium salt of acetone oxime and 4-fluorobenzotrifluoride (16.4 g.) in a mixture of tetrahydrofuran and dimethyl sulfoxide and a reflux period of three hours. The crystalline O-(4-trifluoromethylphenyl)acetone oxime was heated on a steam bath as in Example B1 with 200 ml. of 8 N ethanolic hydrogen chloride for two hours. The reaction mixture was poured into water, the aqueous mixture extracted with ether, and the extract distilled in vacuo to yield 11.0 g. of 2-methyl-5-trifluoromethylbenzofuran, B.P. 95–98° C., at 22 mm., M.P. 30° C. 2-methyl-5-trifluoromethylbenzofuran was found to have in vitro bacteriostatic activity against *Staphylococcus aureus* at a test concentration of 0.20 mg./cc. This compound also was found to cause 34% inhibition of carrageenin-induced local foot edema in fasted rats at 100 mg./kg. orally.

(8) 5-cyano-2-methylbenzofuran, M.P. 76–78° C., was prepared as in Example B1 using 1.7 g. of O-(4-cyanophenyl)acetone oxime in 20 ml. of absolute ethanol, 1.3 ml. of 8.0 N ethanolic hydrogen chloride, and a reflux period of four hours. The product was obtained by evaporating the ethanol from the reaction mixture, extracting with ether, removing the ether, and recrystallizing from ethanol-water.

(9) 1,2,3,4-tetrahydro-8-nitrodibenzofuran.—A mixture containing 8 g. of O-(4-nitrophenyl)cyclohexanone oxime and 50 ml. of ethanolic hydrogen chloride was refluxed for three hours and allowed to cool. The precipitate was collected, washed successively with water and isopropyl alcohol, and recrystallized from isopropyl alcohol to yield 6.4 g. of 1,2,3,4-tetrahydro-8-nitrodibenzofuran, M.P. 144–147° C. This compound was found to have in vitro bacteriostatic activity against *Escherichia coli* and *Pseudomonas aeruginosa* at test concentrations of 0.15 and 0.10 mg./cc. respectively.

(10) 2-chloro-5,6,7,8-tetrahydrobenzofuro-[2,3-b]pyridine, M.P. 93–95° C., was prepared as in Example B9 using 18.5 g. of O-(5-chloro-2-pyridyl)-cyclohexanone oxime, 75 ml. of 5 N ethanolic hydrogen chloride, and a reflux period of two hours. This product was found to have in vitro bacteriostatic activity against *Pseudomonas aeruginosa* at a test concentration of 0.15 mg./cc. This compound also was found to cause 25% inhibition of carrageenin-induced local foot edema in fasted rats at 100 mg./kg. orally.

(11) 2,3-dimethyl-5-nitrobenzofuran.—A mixture containing 5.6 g. of O-(4-nitrophenyl)-2-butanone oxime and 50 ml. of 4.5 N ethanolic hydrogen chloride was heated on a steam bath for two hours and then poured into water. The precipitated product was collected and recrystallized from isopropyl alcohol to yield 1.5 g. of 2,3-dimethyl-5-nitrobenzofuran, M.P. 112–114° C. The filtrate yielded 0.9 g. of material, 70–73° C., which was shown by nuclear magnetic resonance spectral analysis to be a 60–40 mixture of 2-ethyl-5-nitrobenzofuran and 2,3-dimethyl-5-nitrobenzofuran.

(12) 2 - benzoyloxy - 1,2,3,4 - tetrahydro - 8 - nitrodibenzofuran.—A suspension of 12 g. of 4 - [(4 - nitrophenoxy)imino]cyclohexyl benzoate in 100 ml. of acetic acid saturated with hydrogen chloride was warmed until the solid dissolved and the resulting solution was heated on a steam bath for three and one-half hours. The reaction mixture was then poured into one liter of a mixture of ice and water. The solid that separated was collected, washed with water, recrystallized from absolute ethanol and dried in vacuo at 60° C. overnight (about sixteen hours) to yield 7.5 g. of 2-benzoyloxy-1,2,3,4 - tetrahydro - 8 - nitrodibenzofuran, M.P. 156–158° C. A further recrystallization from acetonitrile raised the melting point to 157–159° C. The foregoing preparation can also be run using propionic acid or isobutyric acid in place of acetic acid as the solvent. 2-benzoyloxy - 1,2,3,4 - tetrahydro - 8 - nitrodibenzofuran was found to cause 28% inhibition of carrageenin-induced local foot edema in fasted rats at 200 mg./kg. orally. Also, this compound was found to have in vitro bacteriostatic activity against *Escherichia coli* and *Pseudomonas aeruginosa* each at a test concentration of 0.10 mg./cc.

(13) 2 - phenyl - trifluoromethylbenzofuran.—A mixture containing 7.7 g. of O - (4 - trifluoromethylphenyl) acetophenone oxime and 75 ml. of 8 N hydrogen chloride in ethanol was heated under reflux for two hours and then poured into water. The solid that separated was collected and recrystallized from n - hexane to yield 6.4 g. of 2 - phenyl - 5 - trifluoromethylbenzofuran, M.P. 134–135.5° C. This compound was found to have in vitro bacteriostatic activity against *Staphylococcus aureus* and *Proteus vulgaris* at test concentrations of 0.050 and 0.075 mg./cc. respectively.

(14) Ethyl 2 - methyl - 5 - nitrobenzofuran - 3 - acetate.—To a solution containing 7.5 g. of tert-butyl levulinate oxime in 100 ml. of dry dimethylformamide was added 4.5 g. of potassium tert-butoxide. To the resulting yellow solution was added 5.6 g. of 4 - fluoronitrobenzene in about 10 ml. of dimethylformamide whereupon an exothermic reaction raised the temperature of the reaction mixture to about 45–50° C. The reaction mixture was stirred at room temperature for about ninety minutes and then poured into 600 ml. of water. After the aqueous mixture had been extracted with ether, the aqueous mixture was saturated with sodium chloride and extracted again with ether. The combined ether extracts were washed with water, dried, treated with decolorizing charcoal and filtered, and evaporated in vacuo to yield, as an oil, tert-butyl O-(4 - nitrophenyl)levulinate oxime which was converted to the benzofuran without further purification. A small portion of said oily product was refluxed in ethanolic hydrogen chloride for about ninety minutes. The hot reaction mixture was filtered to remove the precipitated ammonium chloride which was washed with absolute ethanol. The filtrate yielded a crystalline product which was collected, washed with water and recrystallized from ethanol to yield the crystalline product, ethyl - methyl-5-nitrobenzofuran-3-acetate, M.P. 114–116° C.

(15) 7 - chloro - 2 - methyl - 5 - nitrobenzofuran.—A mixture containing 1 g. of O - (2 - chloro - 4 - nitrophenyl) - acetone oxime and 15 ml. of 7 N ethanolic hydrogen chloride was heated on a steam bath for two hours. The ethanol was evaporated off in vacuo and water was added to the residual material. The solid was collected, washed with water, and recrystallized from isopropanol alcohol to yield 0.4 g. of 7 - chloro - 2-methyl - 5 - nitrobenzofuran, M.P. 119–121° C.

(16) N,N - dimethyl - 2 - phenyl - 5 - benzofuransulfonamide, M.P. 166–168° C., from benzene-isopropyl alcohol, was prepared as in Example B1 using 1.0 g. of O - (4 - N,N - dimethylsulfamylphenyl)acetophenone oxime, ethanolic hydrogen chloride and a reflux period of three hours. This compound was found to have in vitro bacteriostatic activity against *Staphylococcus aureus*, *Escherichia coli* and *Proteus vulgaris* each at a test concentration of 0.075 mg./cc.

(17) N,N - dimethyl - 2 - (4 - methoxyphenyl) - 5-benzofuransulfonamide, 5.7 g., M.P. 215–217° C., from dimethylformamide-absolute ethanol, was prepared as in Example B1 using 8 g. of O - (4 - N,N - dimethylsulfamylphenyl) - 4 - methoxyacetophenone oxime, 75 ml. of 8.8 N ethanolic hydrogen chloride and 55 ml. of absolute ethanol and a reflux period of two hours. This compound was found to have in vitro bacteriostatic activity against *Escherichia coli* at a test concentration of 0.10 mg./cc.

(18) 2 - phenyl - 7 - trifluoromethylbenzofuran, 5.4 g., M.P. 49–52° C., from n-pentane after distilling at 100–105° C. at 0.1 mm., was prepared as in Example B1 using 12 g. of O - (2 - trifluoromethylphenyl) acetophenone oxime, 100 ml. of 8 N ethanolic hydrogen chloride and a reflux period of three hours. The product was extracted with ether after the reaction mixture was poured into water and then distilled under reduced pressure after drying the ether extract and removing the ether. 2 - phenyl - 7 - trifluoromethylbenzofuran was found to have in vitro bacteriostatic activity tagainst *Staphylococcus aureus* and *Pseudomonas aeruginosa* at test concentrations of 0.050 and 0.10 mg./cc. respectively.

(19) Ethyl 2 - phenyl - 5 - benzofurancarboxylate, 5.9 g., M.P. 111–113° C., from n-heptane (twice), was prepared as in Example B1 using 6.0 g. of O - (4-carbethoxyphenyl)acetophenone oxime, 50 ml. of ethanolic hydrogen chloride and a reflux period of three hours. This compound was found to have in vitro bacteriostatic activity against *Escherichia coli*, *Proteus vulgaris* and *Pseudomonas aeruginosa* each at a test concentration of 0.10 mg./cc.

(20) Ethyl 2 - (4 - methoxyphenyl) - 5 - benzofurancarboxylate, 12.7 g., M.P. 131–132° C., from isopropyl alcohol, was prepared as in Example B1 using 16.5 g. O - (4 - carbethoxyphenyl) - 4 - methoxyacetophenone oxime, 100 ml. of 8.8 N ethanolic hydrogen chloride and a reflux period of two hours.

The above ethyl ester was converted into its 2-diethylaminoethyl ester as follows: To a solution containing 6.3 g. of ethyl 2 - (4 - methoxyphenyl) - 5 - benzofurancarboxylate in 300 ml. of benzene was added 6 g. of 2 - diethylaminoethanol followed by a trace (about 50 mg.) of sodium hydride. The resulting mixture was heated on a steam bath for eight hours. The benzene was distilled off in vacuo and the remaining material was treated with water. The insoluble product was collected, washed with water and taken up in ether. Addition of a solution of hydrogen chloride in ether precipitated the hydrochloride of the basic ester. The hydrochloride was recrystallized first from isopropyl alcohol and then from dimethylformamide to yield 5.2 g. of 2 - diethylaminoethyl 2 - (4 - methoxyphenyl)benzofuran - 5 - carboxylate hydrochloride, M.P. 225–226° C. This compound was found to have in vitro bacteriostatic activity against *Staphylococcus aureus* at a test concentration of 0.0125 mg./cc.

(21) 2 - (4 - methoxyphenyl) - 7 - nitrobenzofuran, 14.1 g., M.P. 122–124° C., from absolute ethanol containing a small quantity of n-hexane, was prepared as in Example B1 using 20 g. of O - (2 - nitrophenyl) - 4-methoxyacetophenone oxime, 200 ml. of 8.8 N ethanolic hydrogen chloride and a reflux period of three hours.

The above 7 - nitrobenzofuran was converted into the corresponding 7 - aminobenzofuran as follows: To a suspension of 7.9 g. of 2 - (4 - methoxyphenyl) - 7-nitrobenzofuran in 200 ml. of absolute ethanol was added in small portions 6 g. of hydrazine hydrate and 4 g. of Raney nickel over a period of ninety minutes. The reaction mixture was then heated for ninety minutes on a steam bath, the Raney nickel filtered off, and the filtrate cooled. The precipitated product was collected, dried in vacuo at 60° C. overnight to yield 5.1 g. of 7-amino - 2 - (4 - methoxyphenyl)benzofuran, M.P. 149–151° C.

(22) 2 - methyl - 5 - phenylsulfonylbenzofuran, 4.9 g., M.P. 101–103° C., from isopropyl alcohol, was prepared as in Example B1 using 7 g. of O - (4-phenylsulfonylphenyl)acetone oxime, 50 ml. of 5 N ethanolic hydrogen chloride and a reflux period of two hours. After the reaction mixture had been poured into water, the product was extracted from the aqueous mixture with methylene dichloride.

(23) 2 - methyl - 5 - nitro - 7 - trifluoromethylbenzofuran, 5.9 g., M.P. 75–77° C., from isopropyl alcohol, was prepared as in Example B1 using 16 g. of O - (2-trifluoromethyl - 4 - nitrophenyl)acetone oxime, 100 ml. of 5 N ethanolic hydrogen chloride and a reflux period of four hours. After the reaction mixture had been poured into water, the product was extracted from the aqueous mixture with ether.

(24) 5 - acetyl - 2 - methylbenzofuran, M.P. 62–66° C., from ethanol, was prepared as in Example B1 using 0.8 g. of O - (4 - acetylphenyl)acetone oxime, 1 ml. of 7.9 N ethanolic hydrogen chloride and a reflux period of one hour.

(25) 2 - methyl - 5 - nitrobenzofuran is also obtained following the procedure of Example B1 by heating O-(4 - nitrophenyl)acetone oxime in ethanol under reflux using in place of hydrogen chloride a corresponding molar equivalent quantity of sulfuric acid, boron trifluoride etherate, methanesulfonic acid or p-toluene-sulfonic acid.

In each of the following product claims where compounds are claimed in Markush fashion, the invention includes each of the members or any sub-combination thereof.

The subject matter which the applicant regards as his invention is particularly pointed out and distinctly claimed as follows:

1. A compound selected from the group consisting of 2 - benzoyloxy - 1,2,3,4 - tetrahydro - 8 - nitrodibenzofuran and 2 - chloro - 5,6,7,8 - tetrahydrobenzofuro-[2,3-b]pyridine.

2. The process which comprises heating in an acidic medium an O - (2 - pyridyl) - cyclohexanone oxime to form a 5,6,7,8 - tetrahydrobenzofuro[2,3-b]pyridine.

3. The process according to claim 2 where O - (5-chloro - 2 - pyridyl)cyclohexanone oxime is heated with ethanolic hydrogen chloride to form 2 - chloro - 5,6,7,8-tetrahydrobenzofuro[2,3-b]pyridine.

No references cited.

HENRY R. JILES, *Primary Examiner.*

ALAN L. ROTMAN, *Assistant Examiner.*

U.S. Cl. X.R.

260—346.2, 465, 477, 556, 566, 999

PO-1050
(5/69)

UNITED STATES PATENT OFFICE
CERTIFICATE OF CORRECTION

Patent No. 3,452,033        Dated June 24, 1969

Inventor(s) Aram Mooradian

It is certified that error appears in the above-identified patent and that said Letters Patent are hereby corrected as shown below:

Column 1, line 68, "patened" should read --patented--. Column 3, line 70, ")actone" should read --)acetone--. Column line 4, ")imido" should read --)imino--; line 60, "disilling" should read --distilling--. Column 5, line 7, "baht" should read --bath--; line 8, delete "three hours on a steam bath. I was then poured into" and in place thereof insert --water whereupon the crystalline product separated. The--; line 22, ")cyclopheanone" should read --)cyclohexanone--; line 48, "colmn" should read --column--. Column 7, line 52, "hydroclor should read --hydrochloride--. Column 9, line 42, "phenyl-trifluoromethylbenzofuran" should read --phenyl-5-trifluorometh benzofuran--; line 66, "mbined" should read --bined--. Column line 2, "ethyl-methyl" should read --ethyl 2-methyl--; line 42 "tagainst" should read --against--.

SIGNED AND
SEALED
JUN 2 1970

(SEAL)
Attest:

Edward M. Fletcher, Jr.
Attesting Officer

WILLIAM E. SCHUYLER, JR.
Commissioner of Patents